(12) United States Patent
Tuan et al.

(10) Patent No.: US 12,272,505 B2
(45) Date of Patent: Apr. 8, 2025

(54) KEY STRUCTURE AND KEYBOARD MODULE

(71) Applicant: Lite-On Technology Corporation, Taipei (TW)

(72) Inventors: Hao Jan Tuan, Taipei (TW); Hsin-Fu Liu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/939,913

(22) Filed: Sep. 7, 2022

(65) Prior Publication Data

US 2023/0079208 A1 Mar. 16, 2023

Related U.S. Application Data

(60) Provisional application No. 63/242,498, filed on Sep. 10, 2021, provisional application No. 63/251,691, filed on Oct. 4, 2021.

(30) Foreign Application Priority Data

Aug. 11, 2022 (CN) .......................... 202222112534.6

(51) Int. Cl.
*H01H 13/7065* (2006.01)
(52) U.S. Cl.
CPC .............................. *H01H 13/7065* (2013.01)
(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| 8,779,308 | B2* | 7/2014 | Takemae | H01H 13/14 |
| | | | | 200/344 |
| 2007/0235306 | A1* | 10/2007 | Chiba | H01H 13/83 |
| | | | | 200/314 |
| 2012/0048701 | A1* | 3/2012 | Liu | H01H 3/125 |
| | | | | 200/344 |
| 2018/0330898 | A1* | 11/2018 | Chen | H01H 13/7073 |

FOREIGN PATENT DOCUMENTS

| CN | 201829394 | 5/2011 |
| CN | 102110543 | 6/2011 |
| CN | 205487872 | 8/2016 |
| CN | 213025900 | 4/2021 |

* cited by examiner

*Primary Examiner* — Ahmed M Saeed
(74) *Attorney, Agent, or Firm* — JCIPRNET

(57) ABSTRACT

The disclosure provides a key structure, which includes a support, a keycap, a linkage, a circuit layer, and a trigger mechanism. The keycap can be lifted and lowered above the support. The linkage is movably connected to the support and the keycap. The support is located between the circuit layer and the linkage. The trigger mechanism is disposed between the circuit layer and the keycap. The key structure of the disclosure provides a disposition of a support spaced circuit layer and a linkage.

20 Claims, 11 Drawing Sheets

KEY STRUCTURE AND KEYBOARD MODULE

CROSS-REFERENCE TO RELATED APPLICATION

This application claims the priority benefit of U.S. provisional application Ser. No. 63/242,498, filed on Sep. 10, 2021, U.S. provisional application Ser. No. 63/251,691, filed on Oct. 4, 2021, and China application serial no. 202222112534.6, filed on Aug. 11, 2022. The entirety of each of the above-mentioned patent applications is hereby incorporated by reference herein and made a part of this specification.

BACKGROUND

Technical Field

The disclosure relates to a key structure and a keyboard module.

Description of Related Art

When a user operates an electronic device such as a desktop calculator, a notebook computer, or a tablet calculator, a keyboard is used as a common input device. In a keyboard structure, one end of a linkage (such as a scissor mechanism) is connected to the baseplate after passing through a circuit layer, and the other end is connected to the keycap. In such key structure, when the linkage is damaged and needs to be replaced, the linkage should be separated from the baseplate. Since the circuit layer is located between the linkage and the baseplate, if the circuit layer is removed together, the circuit electrically connected to the motherboard may be affected.

SUMMARY

The disclosure is related to a key structure, which is configured to connect a support of a linkage and is disposed above a circuit layer.

The disclosure is related to the keyboard module, including the key structure.

According to an embodiment of the disclosure, a key structure includes a support, a keycap, a linkage, a circuit layer, and a trigger mechanism. The keycap is disposed above the support. The linkage is movably connected to the support and the keycap. The support is located between the circuit layer and the linkage. The trigger mechanism is disposed between the circuit layer and the keycap.

In an embodiment according to the disclosure, the support includes a first part and a second part spliced together along a first line, the first part includes a first edge, and the second part includes a second edge corresponding to the first edge.

In an embodiment according to the disclosure, the first part includes a first joining portion located on the first edge and extending along a second line, the second part includes a second joining portion located at the second edge and extending along the second line, and the first joining portion is engaged with the second joining portion.

In an embodiment according to the disclosure, one of the first joining portion and the second joining portion includes a first interlocking structure, and another one of the first joining portion and the second joining portion includes a second interlocking structure corresponding to the first interlocking structure.

In an embodiment according to the disclosure, the first interlocking structure includes a first end and a second end opposite to each other, the first end is connected to the first edge, and a width of the second end is greater than a width of the first end.

In an embodiment according to the disclosure, the first line is perpendicular to the second line.

In an embodiment according to the disclosure, one of the first joining portion and the second joining portion includes a first fixing structure, and another one of the first joining portion and the second joining portion includes a second fixing structure corresponding to the first fixing structure.

In an embodiment according to the disclosure, the support includes a main body and a connecting base, the main body has a first surface and a second surface opposite to each other, the first surface faces the linkage, the second surface faces the circuit layer, and the connecting base disposed on the first surface is connected to the connecting base.

In an embodiment according to the disclosure, the key structure further includes a baseplate, the circuit layer is disposed between the baseplate and the support, the support further includes a first engaging assembly aligning with an opening of the circuit layer and being detachably disposed on a second engaging assembly of the baseplate.

In an embodiment according to the disclosure, one of the first engaging assembly and the second engaging assembly includes a holding portion, another one of the first engaging assembly and the second engaging assembly includes a restriction portion and a hole adjacent to the restriction portion, and the holding portion passes through the hole and abuts on the restriction portion.

In an embodiment according to the disclosure, the baseplate includes a first baseplate unit and a second baseplate unit, and a projection of the support to the baseplate is located inside the first baseplate unit and outside the second baseplate unit.

In an embodiment according to the disclosure, the support includes a main body having a first surface facing the keycap and an extension part protruding from the first surface to define at least one accommodating region, and a projection of the keycap to the support is located within the accommodating region.

In an embodiment according to the disclosure, a top surface of the extension part is lower than or coplanar with a top surface of the keycap.

In an embodiment according to the disclosure, a material of the extension part and the main body is the same, and the extension part and the main body are integrally formed.

In an embodiment of the disclosure, a material of the extension part is different from a material of the main body, and the extension part is injection-molded on the main body.

In an embodiment according to the disclosure, the circuit layer comprises a circuit membrane, a flexible circuit board, a printed circuit board, a touch sensing layer, or a pair of light emitting and receiving elements.

According to an embodiment of the disclosure, a keyboard module includes a circuit layer; a support disposed on the circuit layer; a keycap disposed on the support; a linkage disposed between the support and the keycap with respective sides connected to the support and the keycap; and a trigger mechanism disposed between the circuit layer and the keycap, wherein the support has a first hole corresponding to the trigger mechanism.

In an embodiment according to the disclosure, the keyboard module further includes a baseplate having a first unit and a second unit, wherein the circuit layer disposed between the baseplate and the support with a projection onto the baseplate within the first unit, and a touchpad region is arranged corresponding to the second unit.

In an embodiment according to the disclosure, the circuit layer includes an opening, and the support comprises a first engaging assembly protruding toward the circuit layer and passing through the opening.

In an embodiment according to the disclosure, the keyboard module further includes a light emitting element electrically connected to the circuit layer and aligned with a second hole of the support.

To sum up, in the key structure of the disclosure, the support used to connect the linkage is disposed above the circuit layer. When the linkage is damaged and needs to be replaced, the operator only needs to remove the support and the structure above it, and then remove the damaged linkage on the support for maintenance. It is not necessary to remove the circuit layer, which is more convenient.

DETAILED DESCRIPTION OF DISCLOSED EMBODIMENTS

Figure 1:
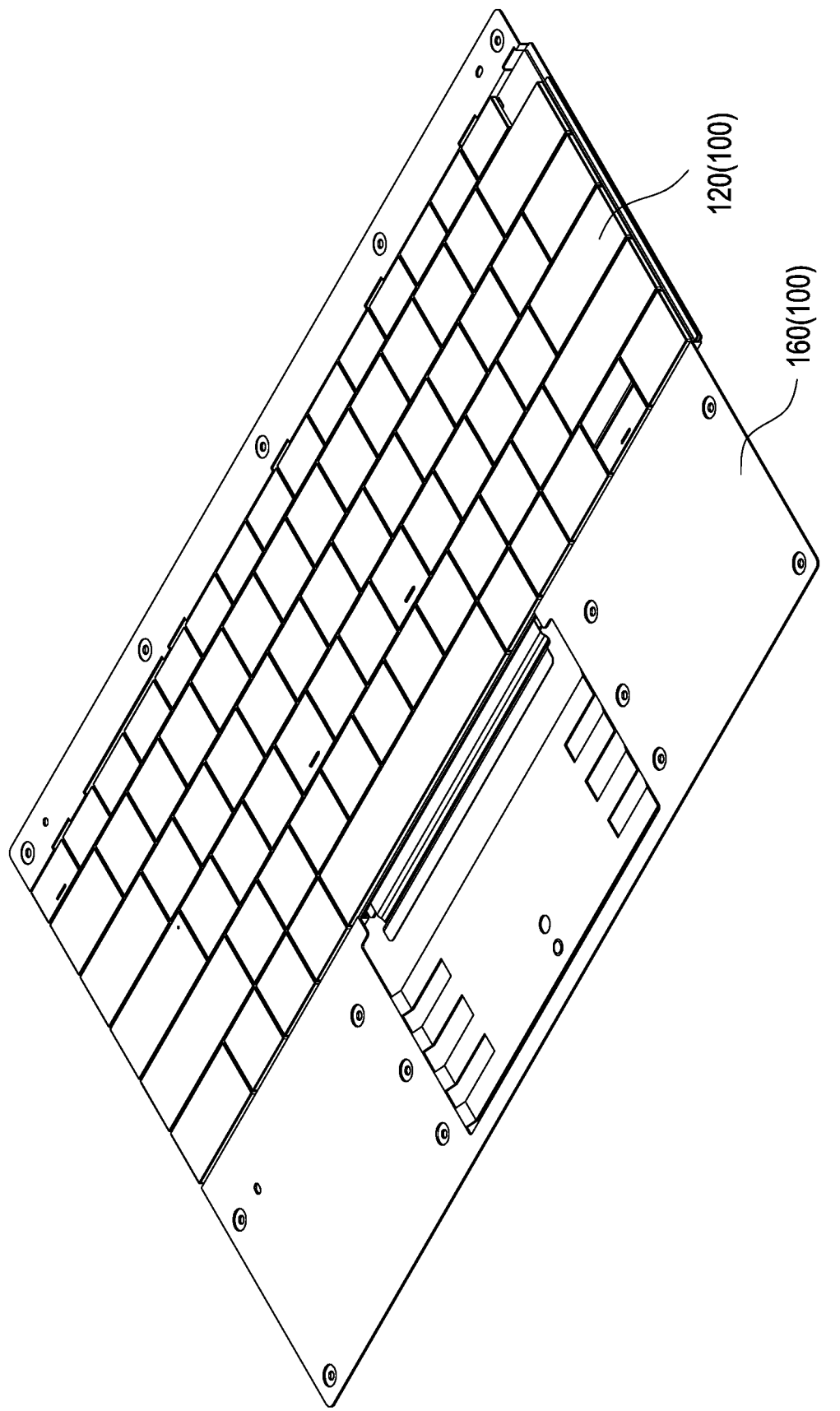
FIG. 1 is a schematic diagram of the appearance of a key structure according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2:
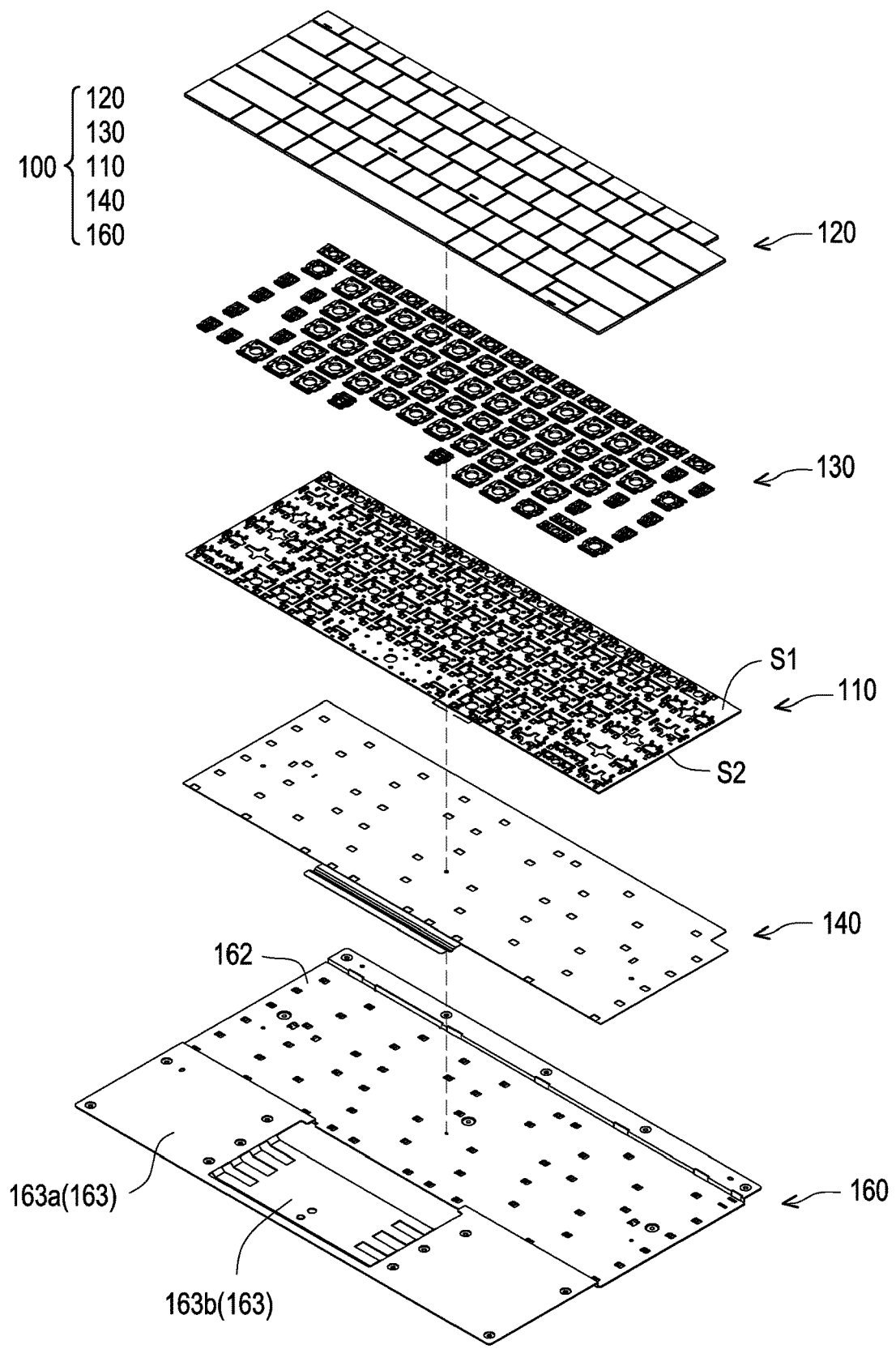
FIG. 2 is an exploded schematic diagram of the key structure of FIG. 1.

FIG. 1 is a schematic diagram of the appearance of a key structure according to an embodiment of the disclosure. FIG. 2 is an exploded schematic diagram of the key structure of FIG. 1. It should be noted that, in order to keep the drawings concise, FIG. 2 has omitted the trigger mechanism. Referring to FIG. 1 and FIG. 2, in this embodiment, a keyboard module 10 includes one or more key structures 100. The key structure 100 may be a key on a keyboard of a notebook computer or an external keyboard.

In detail, as shown in FIG. 2, the key structure 100 of this embodiment includes a support 110, a keycap 120, a linkage 130, and a circuit layer 140. The keycap 120 is disposed above the support 110 in a liftable and lowerable manner. The linkage 130 is movably connected to the support 110 and the keycap 120, and the support 110 is located between the circuit layer 140 and the linkage 130. The linkage 130 is, for example, a scissor-like mechanism, but not limited thereto. The circuit layer 140 is, for example, a circuit membrane, a flexible circuit board, a printed circuit board, a touch sensing layer, in which the touch sensing layer may trigger by detecting changes in capacitive, electromagnetic, and optical signals caused by pressing the keycap 120, or a pair of light emitting and receiving elements.

Figure 3:
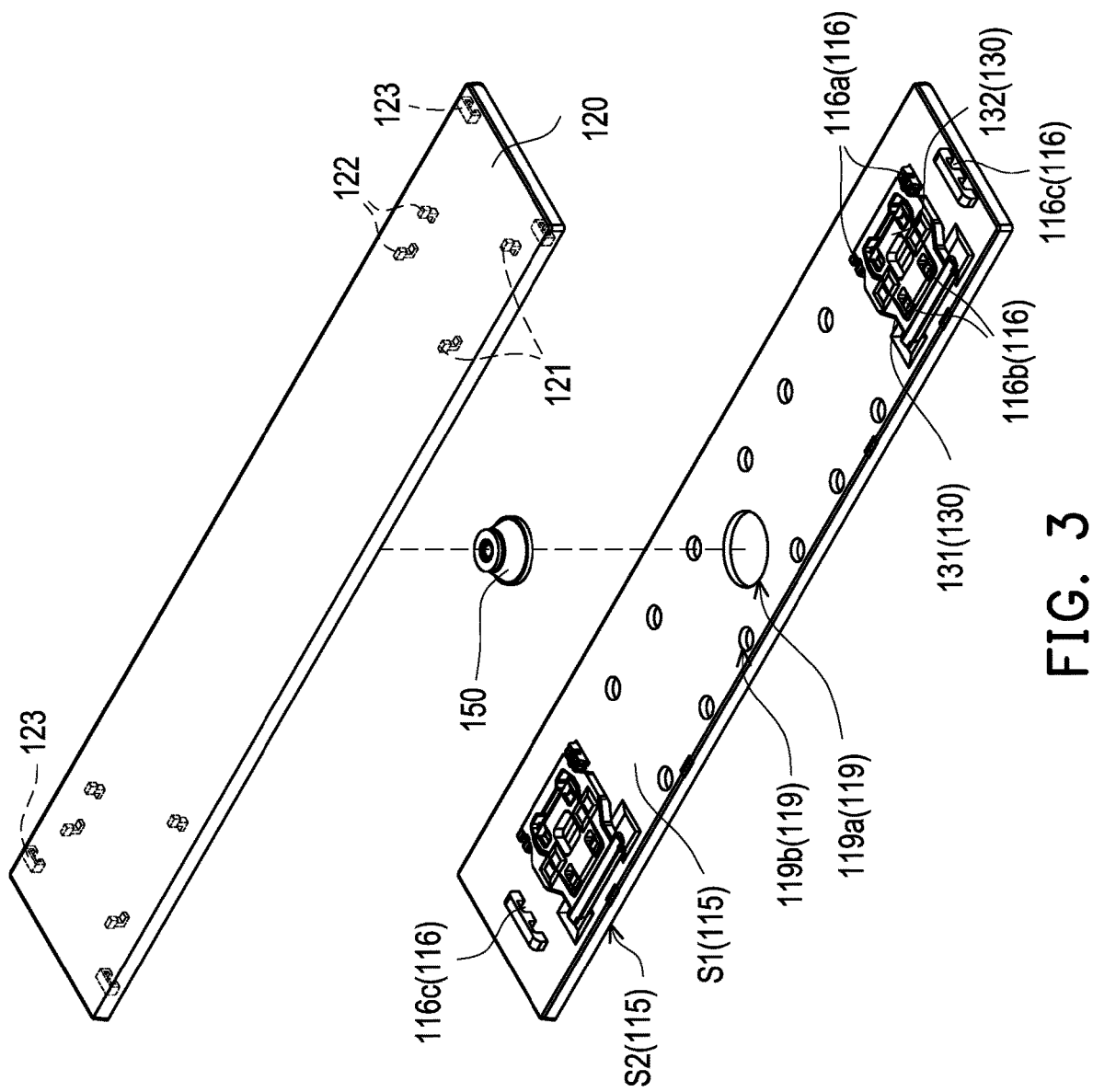
FIG. 3 is a partial exploded schematic diagram of the support, the linkage, and the trigger mechanism of the key structure of FIG. 1.

Specifically, the key structure 100 of this embodiment is assembled by a keycap 120, a linkage 130, a support 110, and a circuit layer 140 in sequence. FIG. 3 is a partial exploded schematic diagram of the support, the linkage, and the trigger mechanism of the key structure of FIG. 1. Referring to FIG. 2 and FIG. 3 at the same time, the support 110 of this embodiment includes a main body 115 and a connecting base 116. The main body 115 has a first surface 51 and a second surface S2 opposite to each other. The first surface 51 faces the linkage 130, and the second surface S2 faces the circuit layer 140. The connecting base 116 is disposed on the first surface 51, and both ends of the linkage 130 are pivotally connected to the connecting base 116 and the keycap 120.

The linkage 130 includes a first support 131 and a second support 132 pivotally connected to the first support 131. The keycap 120 includes a first engagement portion 121 and a second engagement portion 122. The connecting base 116 includes a first connecting base 116a and a second connecting base 116b. One end of the first support 131 is connected to the first engagement portion 121, and the other end of the first support 131 is connected to the first connecting base 116a. One end of the second support 132 is connected to the second engagement portion 122, and the other end of the second support 132 is connected to the second connecting base 116b. The key structure 100 connects the keycap 120 and the support 110 through the linkage 130, and the linkage 130 supports the keycap 120 and maintains the stability of the keycap 120 when the keycap 120 moves up and down relative to the support 110.

In addition, the key structure 100 of this embodiment includes a trigger mechanism 150 disposed between the circuit layer 140 (FIG. 2) and the keycap 120, and the trigger mechanism 150 passes through a hole 119a (first hole) on the support 110 and is connected to the circuit layer 140. In some embodiments, the trigger mechanism 150 could be physically or electrically connected to the circuit layer 140. The trigger mechanism 150 is, for example, a dome-shaped elastic body, and the shape of the hole 119a is correspondingly circular, but the shapes of the trigger mechanism 150 and the hole 119a are not limited thereto, as long as the shape of the hole 119a may not interfere with the trigger mechanism 150.

When the keycap 120 is pressed, the trigger mechanism 150 is squeezed by the keycap 120 and deformed, thereby contacting the circuit layer 140 to trigger a command action. When the force pressing the keycap 120 is removed, the trigger mechanism 150 provides the keycap 120 with an elastic restoring force to drive the keycap 120 to return to its original position.

In addition, the key structure 100 of this embodiment is, for example, a blank key, the key structure 100 may include two balance bars (not shown), and the keycap 120 includes two third engagement portions 123 on each of the two long sides. The connecting base 116 of this embodiment includes two limiting portions 116c adjacent to the two short sides of the keycap 120. Each of the limiting portions 116c includes two holes. Each of the balance bars does not shown the two third engagement portions 123 which are respectively engaged with the keycap 120 on one of the long sides. The two ends of the balance bar, for example, pass through two of the holes on the two limiting portions 116c of the support 110.

When the user presses on a non-center spot of the keycap 120 (e.g., near one of the short sides), the balance bar simultaneously drives other portions of the keycap 120 (e.g., near the other short side) to be pressed down together. When the force pressing the keycap 120 is removed, the trigger mechanism 150 provides an elastic restoring force to drive the keycap 120 to return to its original position, and the elastic restoring force uniformly drives the entire keycap 120 to return to the original position through the balance bar. The third engagement portion 123 of the keycap 120 and the limiting portion 116c of the connecting base 116 are connected by a balance rod, so that both ends of the keycap 120 may be lifted and lowered synchronously when the keycap 120 is lowered or returned to its original position to avoid affecting the triggering.

In the above embodiment, an elastic body is used as the trigger mechanism 150 as an example. In other embodiments, when the circuit layer 140 is a touch sensing layer or is provided with a pair of light emitting and receiving elements, the trigger mechanism may include a sensing electrodes or a light signal interruption portion according to the detected signal of the circuit layer 140 which could sense or detect changes in capacitive, electromagnetic, and optical signals when the keycap 120 is pressed, thereby triggering the keyswitch.

The support 110 further includes a hole 119b (second hole). The hole 119b of the support 110 corresponds to a light-emitting component (not shown) on the circuit layer 140, so that the light emitted by the light-emitting component may pass through the hole 119b and travel towards the direction of the keycap 120. In an embodiment, the light-emitting component is electrically connected to a surface of the circuit layer 140 facing the support 110, and the light-emitting component may be aligned with one of the holes 119b of the support 110. The holes 119b shown in FIG. 3 are multiple circular holes, but the number, shape, and arrangement position of the holes 119b are not limited thereto. The shape of the hole 119b may also be adjusted to a square or oval shape as required, so that the user may see uniform light emitted from the periphery of the keycap 120 or the character light-transmitting region (not shown). The light emitting element is, for example, a light emitting diode (LED), but the type of the light emitting element is not limited thereto.

Figure 4A:
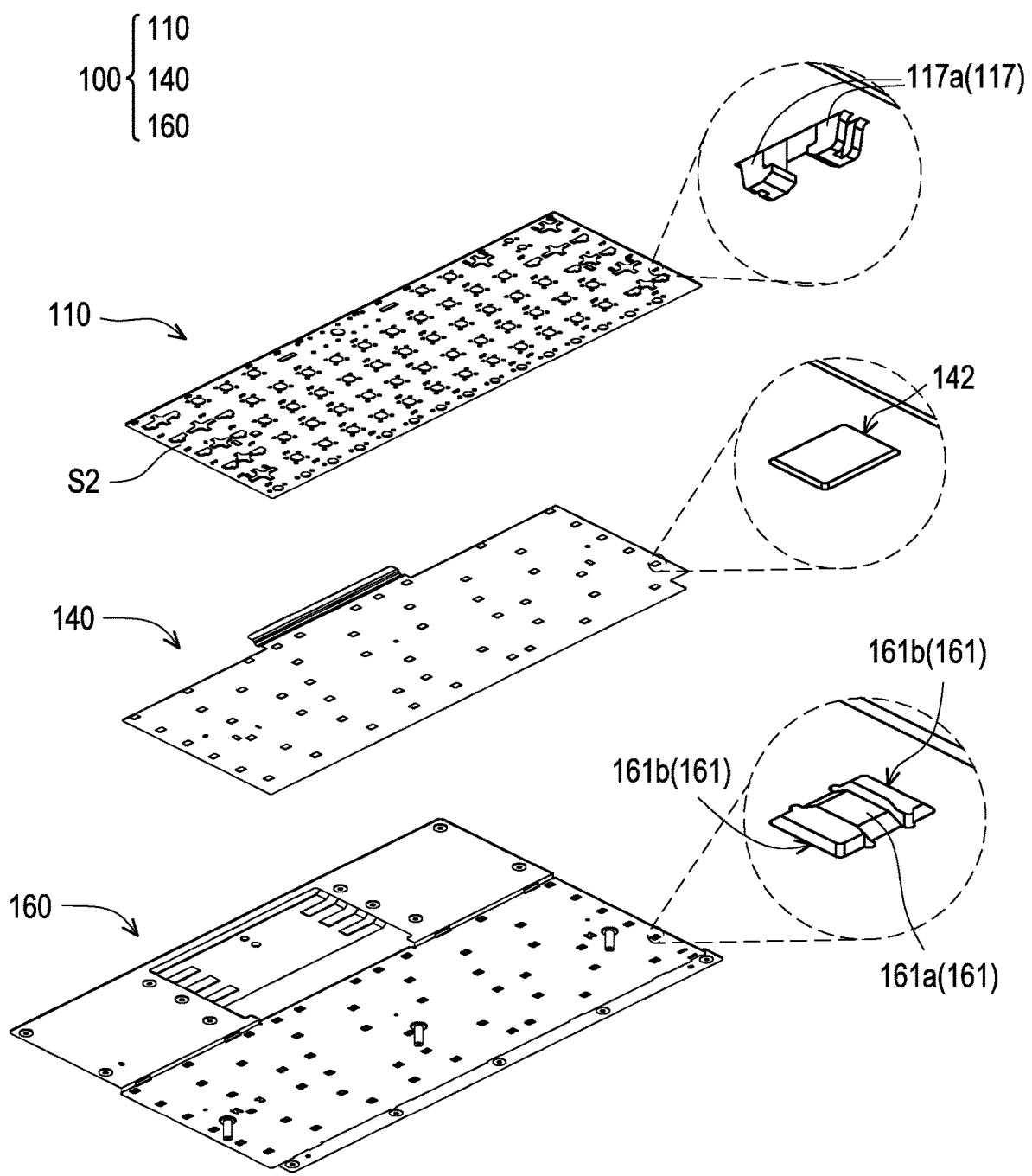
FIG. 4A is an exploded schematic diagram of the support, the circuit layer, and the baseplate of the key structure of FIG. 2 from another viewing angle.
Figure 4B:
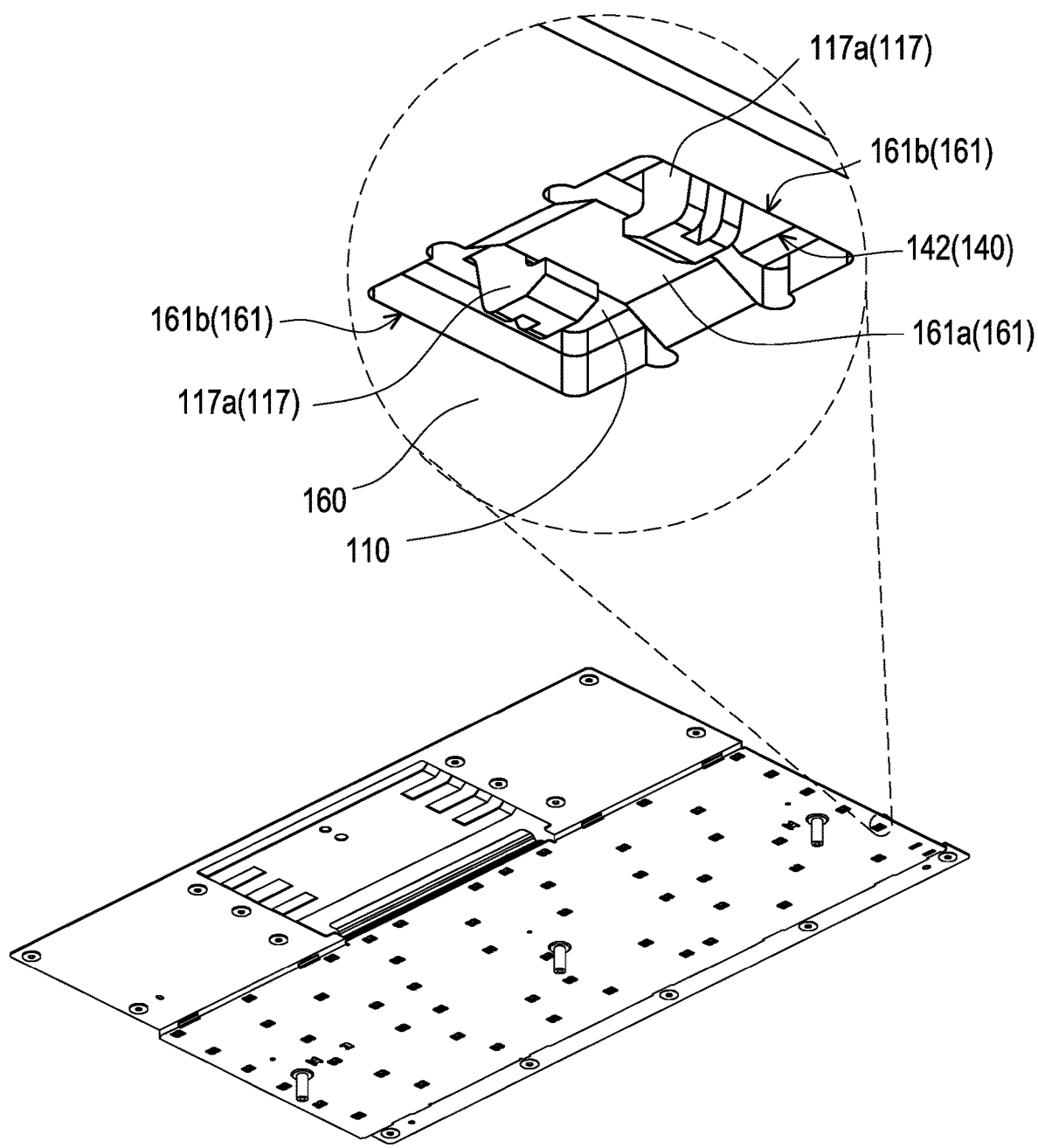
FIG. 4B is a schematic diagram of the support, the circuit layer, and the baseplate of FIG. 4A after being combined.

FIG. 4A is an exploded schematic diagram of the support, the circuit layer, and the baseplate of the key structure of FIG. 2 from another viewing angle. FIG. 4B is a schematic diagram of the support, the circuit layer, and the baseplate of FIG. 4A after being combined. Referring to FIG. 4A and FIG. 4B, the key structure 100 of the present embodiment further includes a baseplate 160. The baseplate 160 has a first unit (a right part in FIG. 4A) and a second unit (a left part in FIG. 4A), the circuit layer 140 is disposed between the baseplate 160 and the support 110 with a projection onto the baseplate 160 within the first unit, and a touchpad region is arranged corresponding to the second unit. In addition, the support 110 further includes a first engaging assembly 117 located on the second surface S2. The circuit layer 140 includes an opening 142 aligning with the first engaging assembly 117. The baseplate 160 includes a second engaging assembly 161 aligning with the first engaging assembly 117. The first engaging assembly 117 of the support 110 passes through the opening 142 and is detachably disposed on the second engaging assembly 161 of the baseplate 160.

In detail, as shown in FIG. 4A, the first engaging assembly 117 includes, for example, two holding portions 117a facing each other. The two holding portions 117a are, for example, plastic, so they are elastic and slightly flexible. The second engaging assembly 161 includes, for example, a restriction portion 161a and two holes 161b located on both sides of the restriction portion 161a and adjacent to the restriction portion 161a. When the operator combines the support 110, the circuit layer 140, and the baseplate 160 with each other, after the two holding portions 117a of the support 110 pass through the opening 142 on the circuit layer 140, the two holding portions 117a are pulled apart by both ends of the restriction portion 161a and respectively pass through the two holes 161b of the baseplate 160. The two holding portions 117a passing through the two holes 161b are hooked to the restriction portion 161a of the baseplate 160 due to their elastic return. Conversely, when the operator detaches the support 110 from the baseplate 160, the operator only needs to apply force to directly pull the support 110 up, so that the two holding portions 117a are pulled apart by the restriction portion 161a and are respectively separated from the two holes 161b and the opening 142. Such a design enables the support 110 to be easily disassembled from the baseplate 160 and the circuit layer 140 without using other tools, thereby reducing the disassembly and assembly time in the maintenance process.

It should be noted that, in other embodiments, the first engaging assembly 117 of the support 110 may be a restriction portion 161a and two holes 161b, and the second engaging assembly 161 of the baseplate 160 may be two holding portions 117a. The disclosure does not limit the types of the first engaging assembly 117 and the second engaging assembly 161.

In addition, returning to FIG. 2, the baseplate 160 of this embodiment includes a first baseplate unit 162 and a second baseplate unit 163. The projection of the support 110 to the baseplate 160 is located inside the first baseplate unit 162 and outside the second baseplate unit 163. In other words, when the support 110 is assembled to the baseplate 160, it is assembled on the first baseplate unit 162, and the second baseplate unit 163 is exposed on one side of the support 110. In addition, the second baseplate unit 163 includes a palm rest region 163a and a touchpad region 163b. The palm rest region 163a provides a region where the palm of the user rests, and the touchpad region 163b provides a region where the touchpad is placed.

In the key structure 100 of this embodiment, the support 110 is located above the circuit layer 140, and the baseplate 160 is located below the circuit layer 140. The first surface S1 of the main body 115 of the support 110 includes a connecting base 116 to connect with the linkage 130, and the second surface S2 of the main body 115 includes a first engaging assembly 117 to connect with the second engaging assembly 161 of the baseplate 160.

When the linkage 130 is damaged and needs to be replaced, the operator does not need to disassemble the entire key structure 100, but only needs to detach the support 110 from the baseplate 160 and the circuit layer 140, and then the damaged linkage 130 on the support 110 may be removed for maintenance. Moreover, if both the circuit layer and the connecting base of the key structure are located above the baseplate, the circuit layer may be accidentally damaged when disassembling and assembling the linkage.

In addition, if the circuit layer is to be removed, the circuits electrically connected to the motherboard may be affected. Since the connecting base 116 of this embodiment is disposed on the first surface 51 of the support 110 and the circuit layer 140 is located on the second surface S2 of the support 110, the circuit layer 140 is not easily damaged when disassembling and assembling the linkage 130, and there is no need to move the circuit layer 140. In addition, the first engaging assembly 117 of the support 110 and the second engaging assembly 161 of the baseplate 160 are fixed by fitting the holding portion 117a with the hole 161b, therefore it is not necessary to lock with screws or fix with hot melt when the support 110 is assembled back to the baseplate 160. Since the front and back sides of the support 110 in this embodiment include simple structures for connecting other components, the convenience of the maintenance process is improved and the time of the maintenance process is shortened.

It is worth mentioning that the material of the main body 115 of the support 110 is, for example, plastic, and the whole support 110 has multiple structures such as a first connecting base 116a (FIG. 3), a second connecting base 116b (FIG. 3), and limiting portions 116c (FIG. 3). If the first connecting base 116a, the second connecting base 116b, and the limiting portions 116c are all plastic injection molded directly on the whole support 110, a twist phenomenon may occur, so that the complex structures such as the first connecting base 116a, the second connecting base 116b, and the limiting portion 116c formed on the support 110 are also easily deformed and cannot function. Another form of the support is provided below to improve the molding quality of the support.

Figure 5A:
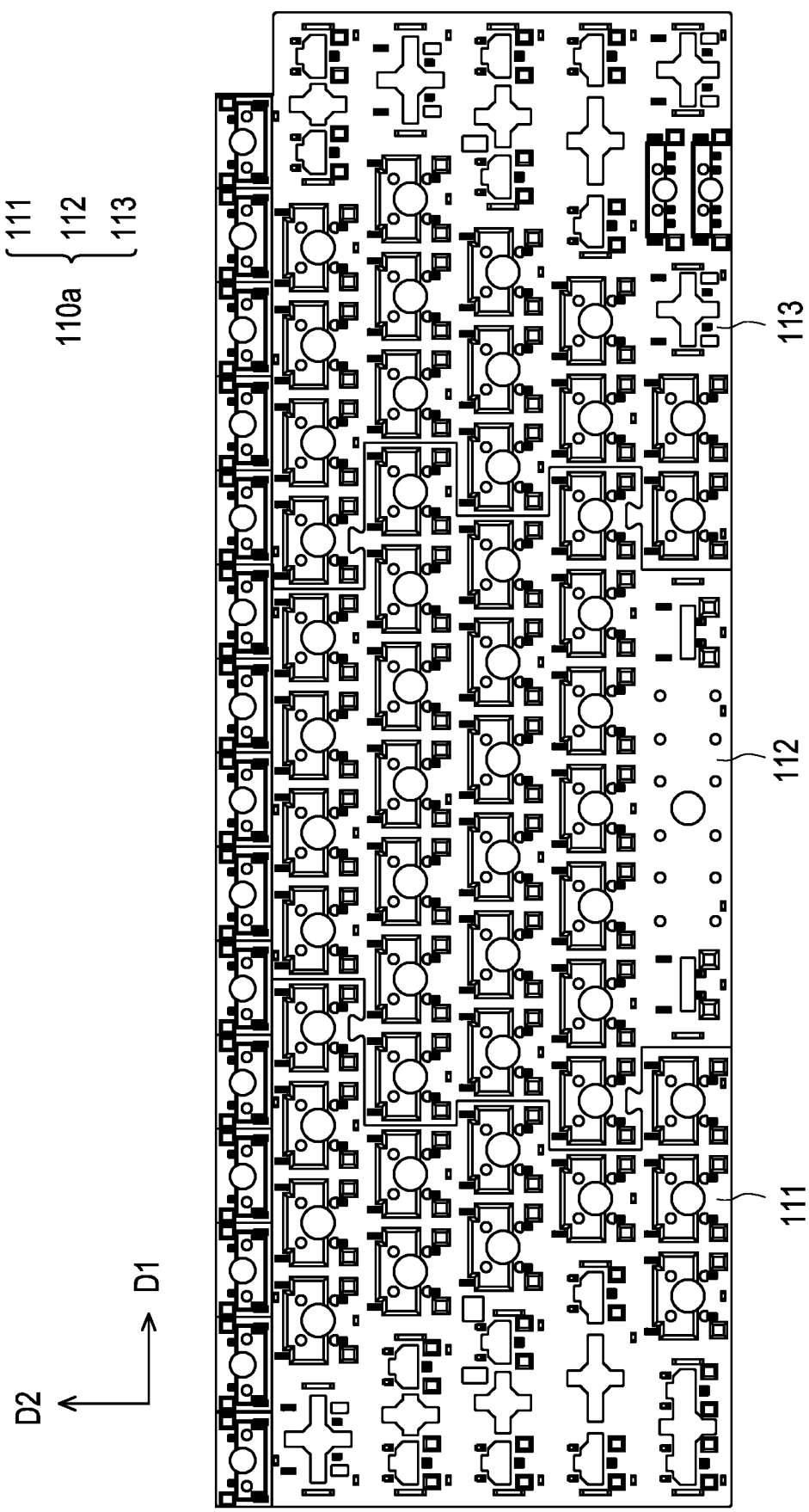
FIG. 5A is a top schematic diagram of a support of another embodiment of the disclosure.
Figure 5B:
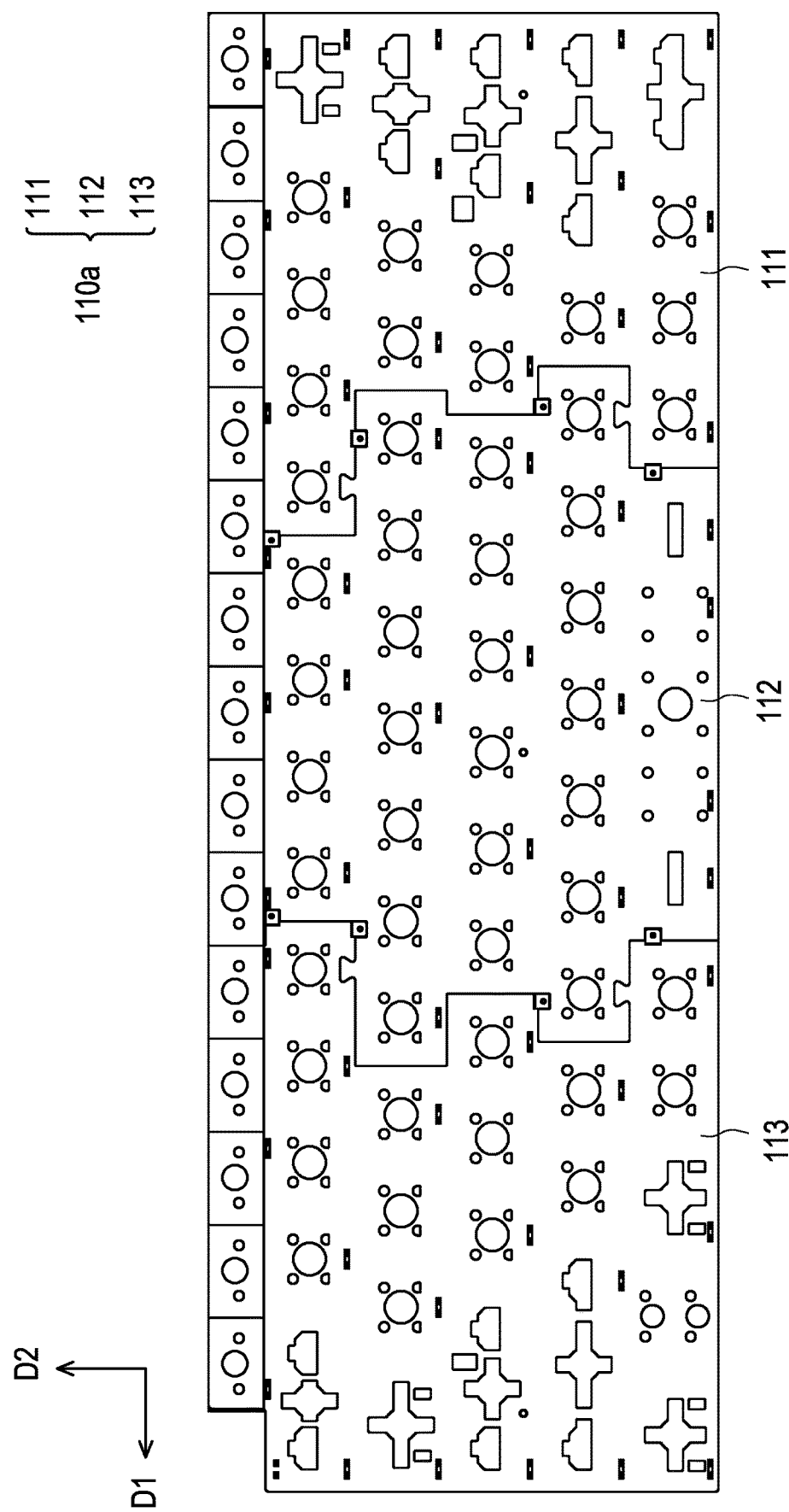
FIG. 5B is a schematic diagram of FIG. 5A flipped by 180 degrees.
Figure 6A:
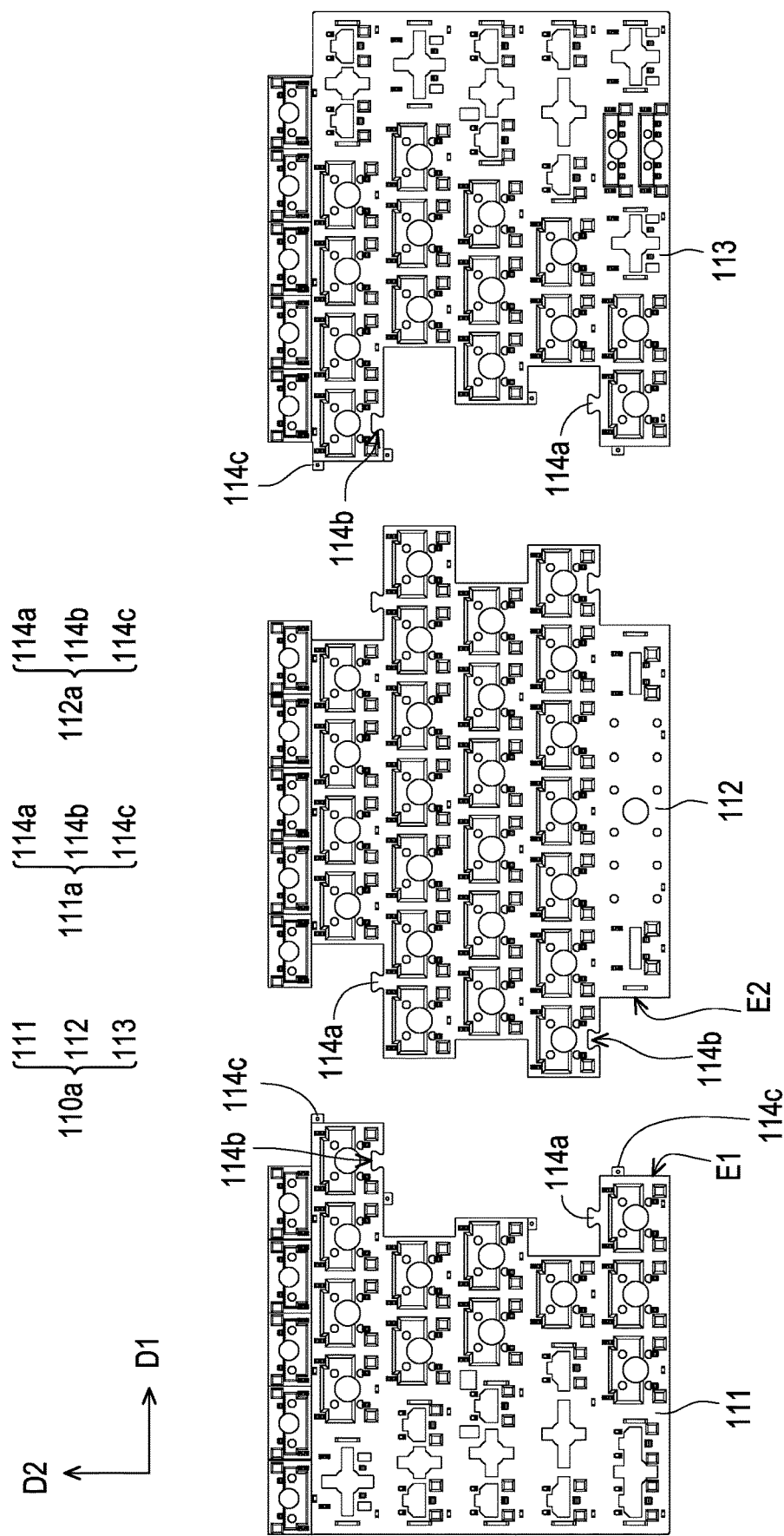
FIG. 6A is a top schematic diagram of the support of FIG. 5A after being disassembled.
Figure 6B:
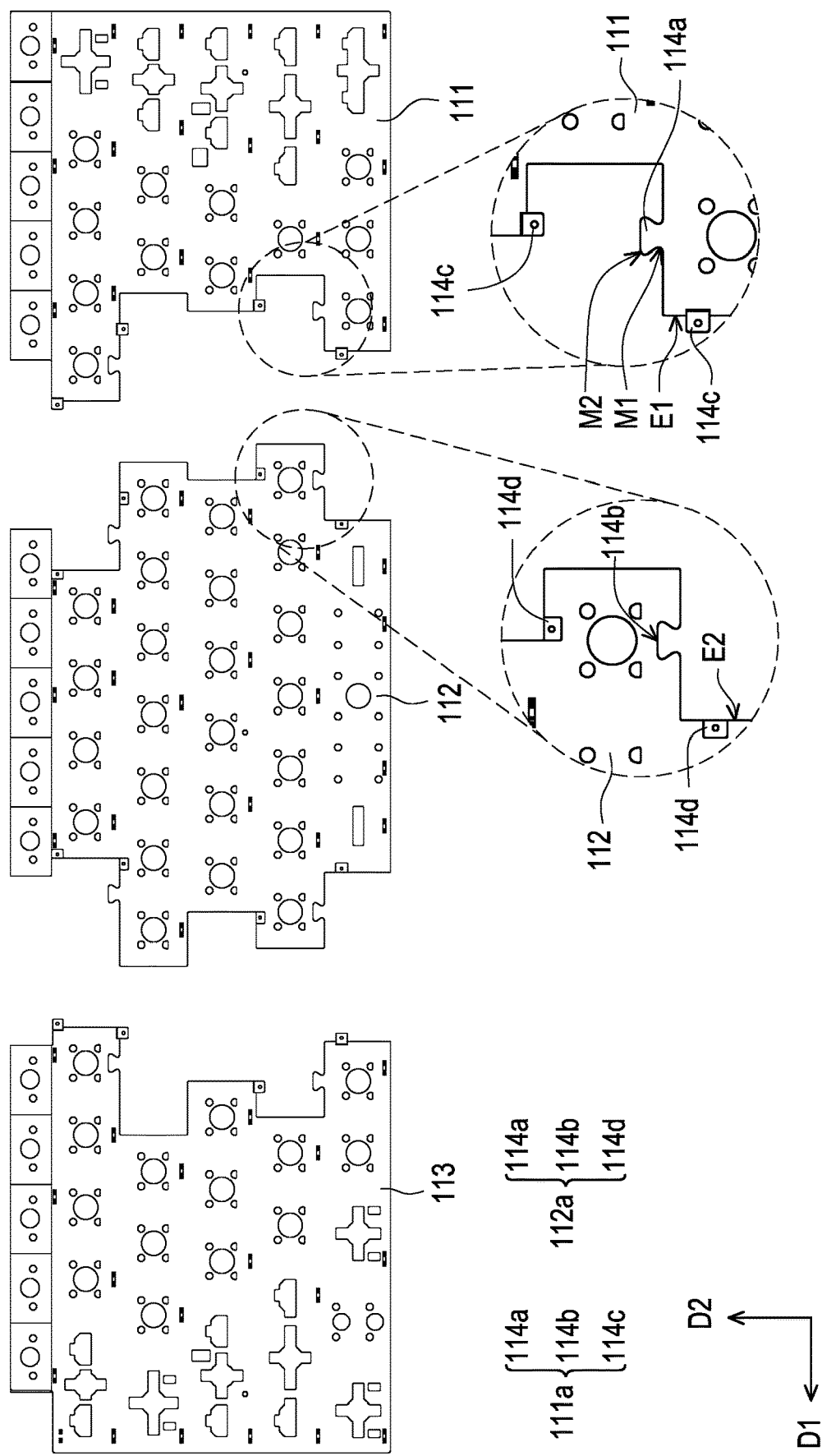
FIG. 6B is a schematic diagram of FIG. 6A flipped by 180 degrees.

FIG. 5A is a top schematic diagram of a support of another embodiment of the disclosure. FIG. 5B is a schematic diagram of FIG. 5A flipped by 180 degrees. FIG. 6A is a top schematic diagram of the support of FIG. 5A after being disassembled. FIG. 6B is a schematic diagram of FIG. 6A flipped by 180 degrees. It should be noted that the left and right sides of FIG. 5A and FIG. 5B are reversed, and the left and right sides of FIG. 6A and FIG. 6B are reversed. Referring to FIG. 5A to FIG. 6B, a support 110a of a key structure 100a of the present embodiment may be divided into at least a first part 111 and a second part 112.

Specifically, the support 110a of the present embodiment includes a first part 111 and a second part 112 spliced together along a first line D1, and the first line D1 is, for example, an axial direction parallel to the long side of the support 110a. The first part 111 includes a first edge E1, and the second part 112 includes a second edge E2. The first edge E1 corresponds to the second edge E2 and faces the second edge E2, and the shape of the first edge E1 and the shape of the second edge E2 fit each other. For example, the shapes of the first edge E1 and the second edge E2 have, for example, tooth-shaped contours. That is to say, when the first part 111 and the second part 112 are spliced to each other, the tooth-shaped contours of the first edge E1 and the second edge E2 completely fit each other along the first line D1.

Further, the first part 111 includes a first joining portion 111a located at the first edge E1, the second part 112 includes a second joining portion 112a located at the second edge E2, and the first joining portion 111a corresponds to the second joining portion 112a.

In this embodiment, one of the first joining portion 111a and the second joining portion 112a includes a first interlocking structure 114a, and the other includes a second interlocking structure 114b having a shape corresponding to the first interlocking structure 114a. The first interlocking structure 114a is, for example, a snap block located on the first edge E1 or the second edge E2, and the second interlocking structure 114b is, for example, a snap hole located on the first edge E1 or the second edge E2. The first interlocking structure 114a includes a first end M1 (FIG. 6B) and a second end M2 (FIG. 6B) opposite along a second line D2. The first line D1 is perpendicular to the second line D2, and the second line D2 is, for example, parallel to the axial direction of the short side of the support 110. The first end M1 is connected to the first edge E1, and the width of the second end M2 is greater than the width of the first end M1. The shapes of the first interlocking structure 114a and the second interlocking structure 114b shown in FIG. 5A to FIG. 6B are, for example, trapezoids. It should be noted that, in this embodiment, the first interlocking structure 114a and the second interlocking structure 114b both extend along the second line D2, but the disclosure is not limited to this. In addition, the first joining portion 111a may include both the first interlocking structure 114a and the second interlocking structure 114b, and the second joining portion 112a may also include both the first interlocking structure 114a and the second interlocking structure 114b.

When the first part 111 and the second part 112 are spliced to each other, the first interlocking structure 114a is connected to the second interlocking structure 114b. Since the first interlocking structure 114a has a design that the width of the second end M2 is greater than the width of the first end M1, and the shape of the second interlocking structure 114b matches the shape of the first interlocking structure 114a, the second end M2 of the first interlocking structure 114a cannot separate from the opening of the second interlocking structure 114b with the same width as the first end M1 along the second line D2. That is, when the first interlocking structure 114a and the second interlocking structure 114b are engaged with each other, the first joining portion 111a and the second joining portion 112a cannot be separated along the second line D2.

Please continue to refer to FIG. 5A to FIG. 6B. When the first interlocking structure 114a and the second interlocking structure 114b are engaged with each other, the direction of the first interlocking structure 114a along the first line D1 is restricted by the second interlocking structure 114b, therefore, the first interlocking structure 114a cannot move relative to the second interlocking structure 114b along the direction of the first line D1. Therefore, when the first joining portion 111a and the second joining portion 112a are combined through the first interlocking structure 114a and the second interlocking structure 114b, the first joining portion 111a and the second joining portion 112a cannot be separated along the first line D1.

Through the shape fitting of the first edge E1 and the second edge E2, and the mutual fitting of the first interlocking structure 114a and the second interlocking structure 114b, the operator must follow the direction perpendicular to the first line D1 and the second line D2 (that is, the direction perpendicular to the surface of the support 110) to disassemble and assemble the first part 111 and the second part 112. Such a design makes it unnecessary for the operator to remove the whole support 110 to maintain the parts on the support 110, rather the operator may remove a portion of the support 110 to obtain the parts thereon, thereby reducing the time required for the maintenance process. In addition, the splicing structure of the first part 111 and the second part 112 is similar to a jigsaw puzzle, so that the operator may easily disassemble and assemble, and the two are not easily separated from each other after being spliced.

In addition, since the first part 111 and the second part 112 in this embodiment are manufactured separately, the quality of the structures such as the first connecting base 116a, the second connecting base 116b, and the limiting portion 116c of the support 110 shown in FIG. 3 may be improved, which is helpful for the structures such as the first connecting base 116a, the second connecting base 116b, and the limiting portion 116c on the support 110 shown in FIG. 3 to more smoothly align and connect with the first support 131, the second support 132, and the third engagement portion 123 of the linkage 130. In addition, the plastic sub-blocks of the support 110a are injection-molded and then joined together, which may avoid warping caused by excessive stress from injection-molding a whole piece of structure at once, and may improve the flatness of the support 110a. Of course, the means of dividing the support 110a into multiple parts may also be applied to other forms of supports.

In addition, referring to FIG. 6A and FIG. 6B, one of the first joining portion 111a and the second joining portion 112a in this embodiment includes a first fixing structure 114c, and the other includes a second fixing structure 114d (FIG. 6B) corresponding to the first fixing structure 114c. For example, the first fixing structure 114c is a hot melt rod, and the second fixing structure 114d is a hot melt hole; when the first part 111 and the second part 112 are spliced into the state shown in FIG. 6B, the first fixing structure 114c is engaged with the second fixing structure 114d through heat treatment to further increase the joining strength between the first part 111 and the second part 112. It should be noted that the first joining portion 111a may include both the first fixing structure 114c and the second fixing structure 114d, and the second joining portion 112a may also include both the first fixing structure 114c and the second fixing structure 114d.

The support 110a of this embodiment further includes a third part 113, and the third part 113 is connected to the second part 112 through the first interlocking structure 114a, the second interlocking structure 114b, and the first fixing structure 114c. It should be noted that the number of the parts is not limited to this embodiment, and the parts may be divided into only two pieces, or divided into four or more pieces.

It is worth mentioning that, in the keyboard structure of some embodiments, an additional keyboard support (decorative plate) is additionally disposed, so that the keycap 120 passes through the opening of the keyboard support (decorative plate), and the additional disposition of the keyboard support (decorative plate) increases the overall thickness and cost. An alternative key structure is described below, which does not require an additional keyboard support (decoration plate).

Figure 7A:
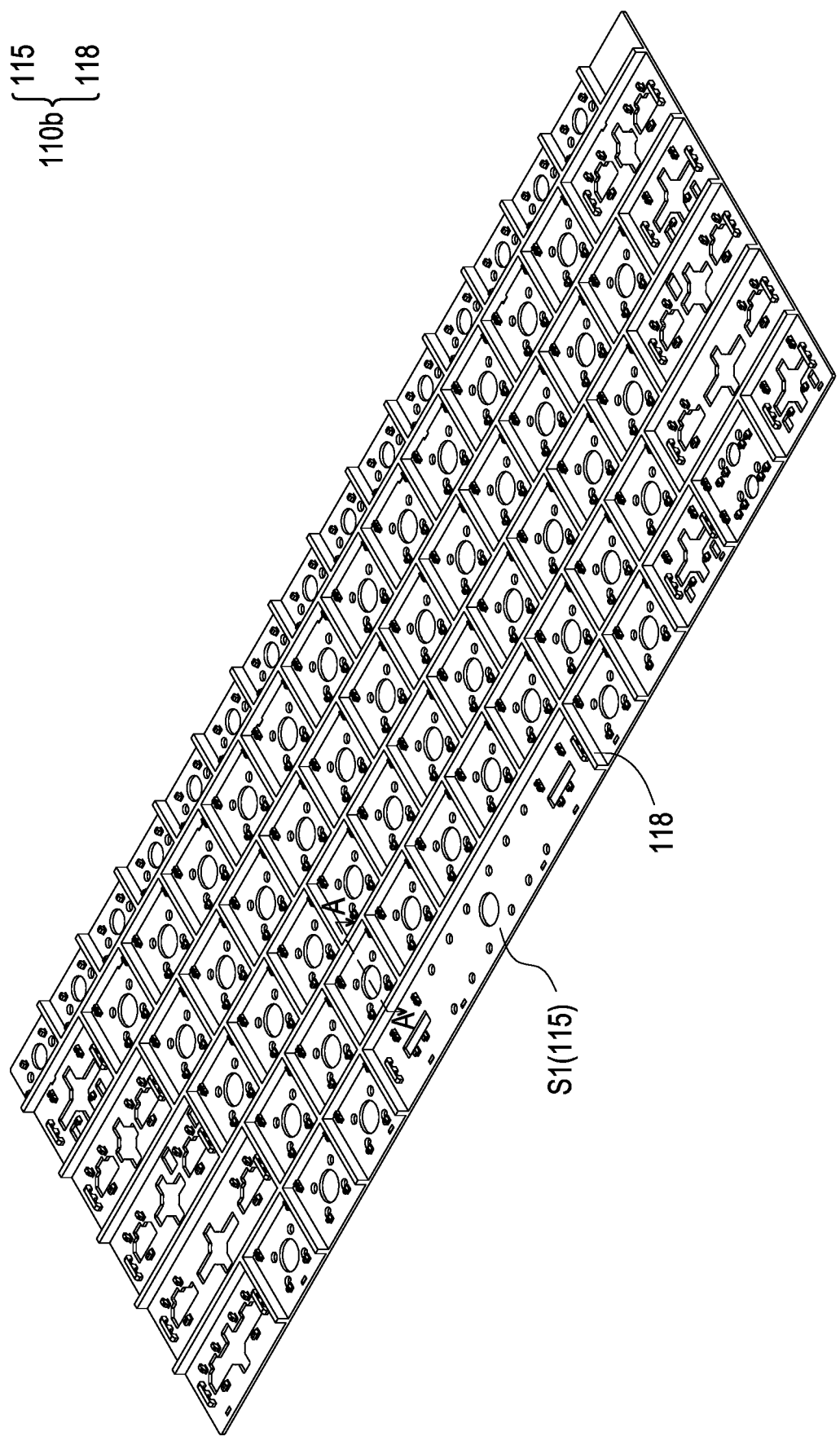
FIG. 7A is a schematic diagram of the appearance of a key structure according to another embodiment of the disclosure.
Figure 7B:
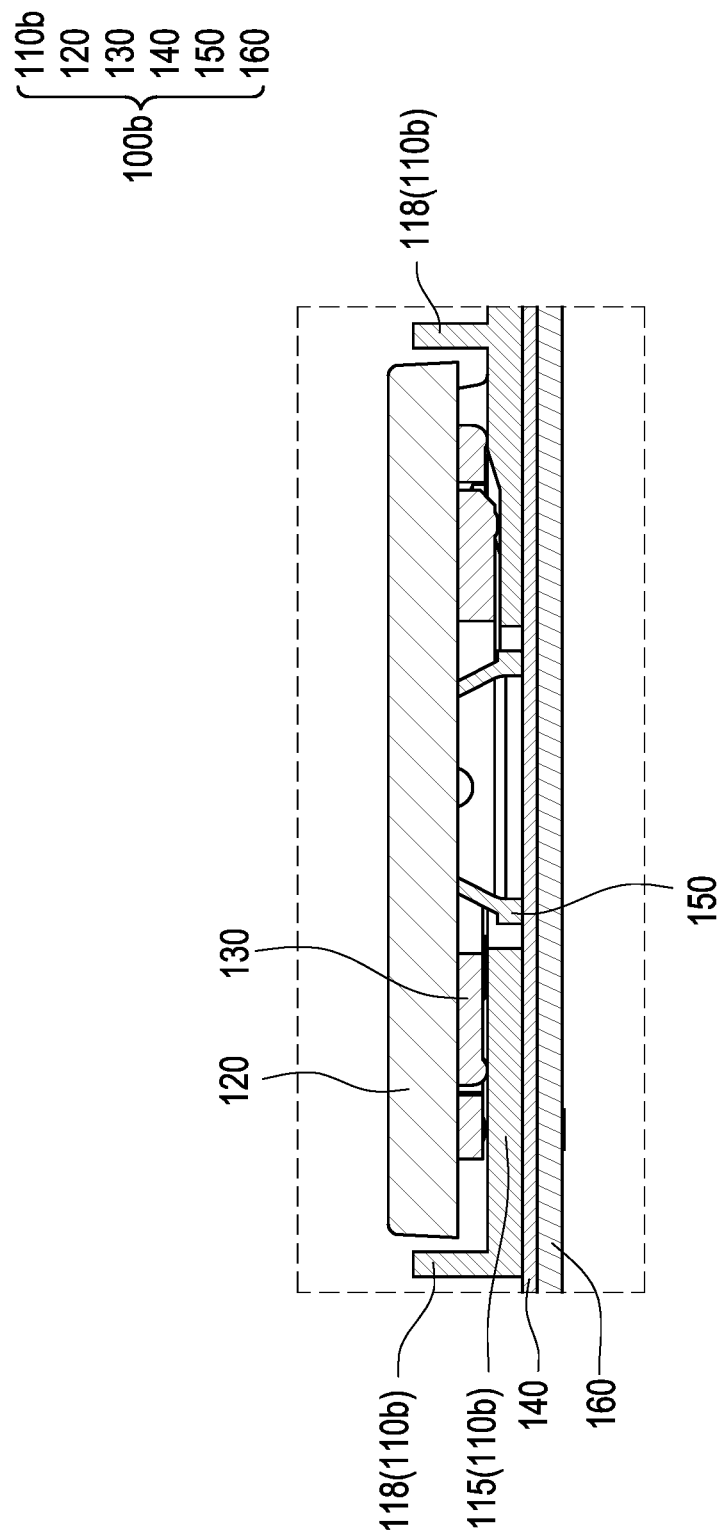
FIG. 7B is a partial cross-sectional schematic diagram of the support assembly of the keycap, the linkage, the circuit layer, the trigger mechanism, and the baseplate along the line A-A of FIG. 7A.

FIG. 7A is a schematic diagram of the appearance of a key structure according to another embodiment of the disclosure. FIG. 7B is a cross-sectional schematic diagram of the key structure of FIG. 7A. Referring to FIG. 7A and FIG. 7B, a support 110b of a key structure 100b of this embodiment further includes an extension part 118. The extension part 118 may be used as a keyboard support (decorative plate) to achieve installation alignment, strengthen the structure, and improve the backlight efficiency. Specifically, the main body 115 of this embodiment has a first surface 51 facing the keycap 120. The extension part 118 protrudes from the first surface 51 and surrounds at least one linkage 130. The extension part 118 may surround the linkage 130 on four sides, surround the linkage 130 on three sides, or surround the linkage 130 on two adjoining sides. The extension part 118 may define multiple accommodating regions, so that the key structures 100b may be respectively aligned and accommodated therein, and the extension part 118 surrounding a single accommodating region may accommodate one or more key structures 100b.

As shown in FIG. 7B, the projection of at least one keycap 120 to the support 110 is located within the range surrounded by the extension part 118. In other words, the extension part 118 surrounds at least one linkage 130, at least one keycap 120, and at least one trigger mechanism 150. In this embodiment, a single accommodating region surrounded by the extension part 118 accommodates one key structure 100b. In addition, a top surface of the extension part 118 is lower than or coplanar with the top surface of the keycap 120, so that when the user presses different keycaps 120, the user experience while using the keyboard is not be diminished due to pressing the extension part 118 between the keycaps 120.

The height of the extension part 118 in this embodiment is lower than or equal to the top surface of the keycap 120, so only the keycaps 120 may be seen on the assembled keyboard, but not the ridge-like extension part 118. Moreover, the extension part 118 may also strengthen the structure of the support 110b and adjust the intensity of the light exposed from the keycap 120. Such a design also enhances the strength and aesthetics of the overall appearance of the keyboard.

In one embodiment, the extension part 118 and the main body 115 are made of the same material, and the extension part 118 and the main body 115 are integrally formed. For example, the extension part 118 and the main body 115 are both made of plastic material. Since the plastic material used for the support 110b is lighter in weight than the common metal material, the burden on the operator to carry the support 110b is reduced. In another embodiment, the material of the extension part 118 is different from that of the main body 115, and the extension part 118 is injection-molded on the main body 115. For example, the main body 115 is made of a metal material, and the extension part 118 is made of a plastic material, so that the structural strength of the support 110b is improved and is not easily damaged.

The extension part 118 of this embodiment is directly formed on the support 110b, thereby reducing the cost of opening the mold. In addition, since this embodiment does not need to additionally assemble a keyboard support (decorative plate), the assembling time of the keyboard is shortened or the process is reduced.

It should be noted that the keyboard module 10 (FIG. 1) may include one of the key structures 100, 100a, and 100b of the above-mentioned different embodiments, or include a combination of several features of the key structures 100, 100a, and 100b of different embodiments, or include all the features of the key structures 100, 100a, and 100b of the different embodiments. For example, the keyboard module 10 may only include features such as, in the key structure 100, the support 110 has a connecting base 116 and a first engaging assembly 117, the circuit layer 140 has an opening 142, and the baseplate has a second engaging assembly 161. The keyboard module 10 may also include all the features of the key structure 100, combined with the feature that the support 110 of the key structure 100a has a first part 111 and a second part 112, and combined with the feature that the support 110 of the key structure 100b includes an extension part 118. The disclosure does not limit a feature combination that the keyboard module 10 includes the key structures 100, 100a, and 100b.

To sum up, the linkage of the key structure of the disclosure is movably connected to the support and the keycap, and the support is located between the circuit layer and the linkage. When the linkage is damaged and needs to be repaired or replaced, the operator only needs to move the support away from the circuit layer and replace the damaged linkage on the support. Since the operator does not need to disassemble the entire keyboard for maintenance, the time spent on the maintenance process may be shortened.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A key structure, comprising:
   a support;
   a keycap, disposed above the support;
   a linkage, movably connected to the support and the keycap;
   a circuit layer, wherein the support is located between the circuit layer and the linkage, and the circuit layer has an extension portion protruding from an edge of the support;
   a trigger mechanism, disposed between the circuit layer and the keycap; and
   a baseplate, wherein the circuit layer is disposed between the baseplate and the support, and the support comprises a first engaging assembly aligning with an opening of the circuit layer,
   wherein the first engaging assembly comprises a first part extending along a first direction, and a second part connecting to an end of the first part and extending along a second direction different from the first direction, and a width of the second part is larger than a width of the first part in the second direction.

2. The key structure according to claim 1, wherein the support comprises a first part and a second part spliced together along a first line, the first part comprises a first edge, and the second part comprises a second edge corresponding to the first edge.

3. The key structure according to claim 2, wherein the first part comprises a first joining portion located on the first edge and extending along a second line, the second part comprises a second joining portion located on the second edge and extending along the second line, and the first joining portion is engaged with the second joining portion.

4. The key structure according to claim 3, wherein one of the first joining portion and the second joining portion comprises a first interlocking structure, and another one of the first joining portion and the second joining portion comprises a second interlocking structure corresponding to the first interlocking structure.

5. The key structure according to claim 4, wherein the first interlocking structure comprises a first end and a second end opposite to each other, the first end is connected to the first edge, and a width of the second end is greater than a width of the first end.

6. The key structure according to claim 3, wherein the first line is perpendicular to the second line.

7. The key structure according to claim 3, wherein one of the first joining portion and the second joining portion comprises a first fixing structure, and another one of the first joining portion and the second joining portion comprises a second fixing structure corresponding to the first fixing structure.

8. The key structure according to claim 1, wherein the support comprises a main body and a connecting base, the main body has a first surface and a second surface opposite to each other, the first surface faces the linkage, the second surface faces the circuit layer, and the linkage is connected to the connecting base on the first surface.

9. The key structure according to claim 1, wherein the first engaging assembly is detachably disposed on a second engaging assembly of the baseplate.

10. The key structure according to claim 9, wherein one of the first engaging assembly and the second engaging assembly comprises a holding portion, another one of the first engaging assembly and the second engaging assembly comprises a restriction portion and a hole adjacent to the restriction portion, and the holding portion passes through the hole and abuts on the restriction portion.

11. The key structure according to claim 9, wherein the baseplate comprises a first baseplate unit and a second baseplate unit, and a projection of the support to the baseplate is located inside the first baseplate unit and outside the second baseplate unit.

12. The key structure according to claim 1, wherein the support comprises a main body having a first surface facing the keycap and an extension part protruding from the first surface to define at least one accommodating region, and a projection of the keycap to the support is located within the accommodating region.

13. The key structure according to claim 12, wherein a top surface of the extension part is lower than or coplanar with a top surface of the keycap.

14. The key structure according to claim 12, wherein a material of the extension part and the main body is the same, and the extension part and the main body are integrally formed.

15. The key structure according to claim 12, wherein a material of the extension part is different from a material of the main body, and the extension part is injection-molded on the main body.

16. The key structure according to claim 1, wherein the circuit layer comprises a circuit membrane, a flexible circuit board, a printed circuit board, a touch sensing layer, or a pair of light emitting and receiving elements.

17. The key structure according to claim 1, wherein the extension portion of the circuit layer is not covered by the keycap.

18. A keyboard module, comprising:
   a circuit layer;
   a support disposed on the circuit layer;
   a keycap disposed on the support;
   a linkage disposed between the support and the keycap with respective sides connected to the support and the keycap;
   a trigger mechanism disposed between the circuit layer and the keycap, wherein the support has a first hole corresponding to the trigger mechanism; and
   a baseplate having a first unit and a second unit, wherein the circuit layer disposed between the baseplate and the support with a projection onto the baseplate within the first unit, and a touchpad region is arranged corresponding to the second unit.

19. The keyboard module according to claim 18, wherein the circuit layer comprises an opening, and the support comprises a first engaging assembly protruding toward the circuit layer and passing through the opening.

20. The keyboard module according to claim 18, further comprising a light emitting element electrically connected to the circuit layer and aligned with a second hole of the support.

* * * * *